(12) United States Patent
Rezvani et al.

(10) Patent No.: US 6,466,088 B1
(45) Date of Patent: Oct. 15, 2002

(54) METHOD AND APPARATUS FOR MULTI-CHANNEL X-DSL LINE DRIVER

(75) Inventors: Behrooz Rezvani, Pleasanton; John Zhongxuan Zhang, Fremont; Dale Smith, Fremont; Caesar Seehoi Wong, Fremont, all of CA (US)

(73) Assignee: Ikanos Communications, Fremont, CA (US)

( * ) Notice: Subject to any disclaimer, the term of this patent is extended or adjusted under 35 U.S.C. 154(b) by 58 days.

(21) Appl. No.: 09/779,254

(22) Filed: Feb. 7, 2001

Related U.S. Application Data (63) Continuation of application No. 09/739,847, filed on Dec. 18, 2000.
(60) Provisional application No. 60/172,382, filed on Dec. 17, 1999.

(51) Int. Cl.[7] .................................................. H03F 1/14
(52) U.S. Cl. ...................... 330/51; 330/124 R; 330/136
(58) Field of Search .............................. 330/51, 124 R, 330/136

(56) References Cited

U.S. PATENT DOCUMENTS

| | | | | |
|---|---|---|---|---|
| 5,287,543 A | * | 2/1994 | Wolkstein | 455/13.3 |
| 5,862,461 A | * | 1/1999 | Yoshizawa | 455/127 |
| 6,014,056 A | * | 1/2000 | Rivierre | 330/124 R |
| 6,320,913 B1 | * | 11/2001 | Nakayama | 375/297 |
| 6,362,685 B1 | * | 3/2002 | Vagher | 330/124 R |

* cited by examiner

Primary Examiner—Michael B Shingleton
(74) Attorney, Agent, or Firm—Cary & Kelly, LLP; Charles C. Cary (57) ABSTRACT

An apparatus and method for reducing power requirements in X-DSL and other communication protocols is disclosed. The apparatus may be applied with equal advantage in wired and wireless media Power is supplied selectively to input lines in which input signals exceed selected threshold levels. The apparatus is configured to support statistical multiplexing of the input signal lines across a plurality of amplification means which support amplification at up to either of at least two power levels. This reduces overall power requirements for the combined input lines. In an embodiment of the invention an apparatus for providing amplification of input signals on corresponding ones of a plurality of input signal lines is disclosed. The apparatus includes primary amplifiers and at least one secondary amplifier with higher output levels than the primary amplifier which can be statistical multiplexed to whichever of the input signal lines requires additional amplification. In an alternate embodiment of the invention each input signal line is coupled to a corresponding amplifier which can be statistically multiplexed to a power supplies of varying output levels depending on the amplification requirements of each of the input signal lines.

15 Claims, 6 Drawing Sheets

METHOD AND APPARATUS FOR MULTI-CHANNEL X-DSL LINE DRIVER

CROSS REFERENCE TO RELATED APPLICATION

This application is a continuation of copending U.S. application Ser. No. 09/739,847 filed Dec. 18, 2000 entitled "Method and Apparatus for Multi-Channel X-DSL Line Driver" which clairs the benefit of prior filed Provisional Applications No. 60/172,382 filed on Dec. 17, 1999 entitled "Multi-Channel VDSL Line-Driver". Each of the above-cited applications is incorporated herein by reference in its entirety.

BACKGROUND OF THE INVENTION

1. Field of Invention

The field of the present invention relates in general to modems and more particularly reducing power dissipation across multiple transmission systems.

2. Description of the Related Art

North American Integrated Service Digital Network (ISDN) Standard, defined by the American National Standard Institute (ANSI), regulates the protocol of information transmissions over telephone lines In particular, the ISDN standard regulates the rate at which information can be transmitted and in what format. ISDN allows full duplex digital transmission of two 64 kilo bit per second data channels. These data rates may easily be achieved over the trunk lines, which connect the telephone cornpanies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation. Currently there are over ten discrete X-DSL standards, including. G.Lite, ADSL, VDSL, SDSL, MDSL, RADSL, HDSL, etc.

One of the primary factors limiting the bandwidth or channel capacity of any of the above discussed X-DSL protocols is power. Large amounts of power are required to drive high baud rates across subscriber lines or other wired or wireless communication media Most of the power in X-DSL systems is consumed in the line driver which drives the modulated signal onto the subscriber line. The line driver may account for 60% or more of the overall system power requirement.

Typically the modulated signal supplied to a line driver has a normal power distribution, meaning that the peak-to-average power ratio is relatively high. Thus to avoid clipping or other distortion the occasional high peak signals require a high voltage supply. Recently efforts have been made reduce the amount of power consumed in a line driver by use of multiple power levels. Texas Instruments THS6032 Class G amplifier architectures uses four power supplies at +/−5 and +/−15 Volts to reduce power consumption. The ADSL line to which this amplifier is coupled is driven at higher voltage levels only when required. U.S. Pat. No. #6,028,486 entitled "Method and Apparatus for Reducing Power Dissipation in Multi-Carrier Amplifiers" issued on Feb. 22, 2000 and assigned to Telefonaktiebolaget L M Ericsson also teaches apparatus for reducing power in a DSL line driver. In a first embodiment, resembling that employed in the Texas Instruments device, a single amplifier is switchably connected to high and low power supplies, in response to the threshold level of an input signal. In a second embodiment dual amplifiers one with a high power supply and the other with a low power supply are switchably connected to the load in response to the threshold level of an input signal. Both the Texas Instruments and Ericsson designs require an increase in the number of power supplies and/or amplifiers associated with a subscriber line.

What is needed are approaches to power reduction with an improved form factor when compared with the prior art designs.

SUMMARY OF THE INVENTION

An apparatus and method for reducing power requirements in X-DSL and other communication protocols is disclosed. The apparatus may be applied with equal advantage in wired and wireless media Power is supplied selectively to input lines in which input signals exceed selected threshold levels. The apparatus is configured to support statistical multiplexing of the input signal lines across a plurality of amplification means which support amplification at up to either of at least two power levels. This reduces overall power requirements for the combined input lines.

In an embodiment of the invention an apparatus for providing amplification of input signals on corresponding ones of a plurality of input signal lines is disclosed. The apparatus includes: primary amplifiers, at least one secondary amplifier, a selector and switches. The primary amplifiers each include an input and an output, with each input coupled to a corresponding one of the plurality of input signal lines. Each of the plurality of primary amplifiers are capable of receiving a corresponding input signal and generating an output signal at up to a first power level. The at least one secondary amplifier also includes an input and an output. The at least one secondary amplifier is responsive to a selected input signal at the input to generate at the output an output signal at up to a second power level greater than the first power level. The selector includes inputs coupled to each of the input signal lines to select at least one input signal line with an input signal amplitude above a selected threshold for amplification by the at least one secondary amplifier. The switches are responsive to the selector for switchably coupling the at least one secondary amplifier to the at least one selected input signal line.

In an alternate embodiment of the invention the apparatus for providing amplification of amplification of input signals includes amplifiers, a first power supply, at least a second power supply, a selector and switches. The plurality of amplifiers each include a signal input, a signal output, and a power supply input. Each signal input is coupled to a corresponding one of the plurality of input signal lines. Each of the plurality of amplifiers is capable of receiving a corresponding input signal and generating an output signal. The first power supply generates a corresponding first power level. The at least a second power supply generates at least a corresponding second power level greater than the first power level. The selector inputs are coupled to each of the input signal lines to select at least one input signal line with an input signal amplitude above a selected threshold; for amplification at up to the second power level. The switches are responsive to said selector for switchably coupling said at least a second power supply to the power supply input of the corresponding at least one of the plurality of amplifiers coupled to the at least one selected input signal line and further switchably coupling power supply inputs of remaining unselected ones of the plurality of amplifiers to said first power supply.

In an another embodiment of the invention a method for amplifying of input signals on corresponding ones of a plurality of input signal lines is disclosed. The method comprises the acts of:

detecting which among the input signal lines includes input signal amplitudes above a selected threshold;

choosing among the input signal lines with input signal amplitudes above the selected threshold, at least a selected one of the input signal lines for further amplification;

amplifying the at least a selected one of the input signal lines at up to at least a second power level greater than a first power level, and amplifying remaining unselected ones of the input signal lines at up to the first power level.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

An apparatus and method for reducing power required for a multi-channel X-DSL line driver is disclosed. Statistical multiplexing of limited power supply is utilized to satisfy peak power demands for a plurality of X-DSL line drivers using either a switched power supply or switched amplification across the line drivers. A method for scaling the power resources is disclosed as well as a method for dealing with contention between channels for limited power supplies. The invention may be used with multi-channel X-DSL line drivers interfacing with any of a number of multi-channel supply architectures. The apparatus may be applied with equal advantage to communication protocols other than X-DSL. The apparatus may be applied with equal advantage in wired and wireless media.

Figure 1:
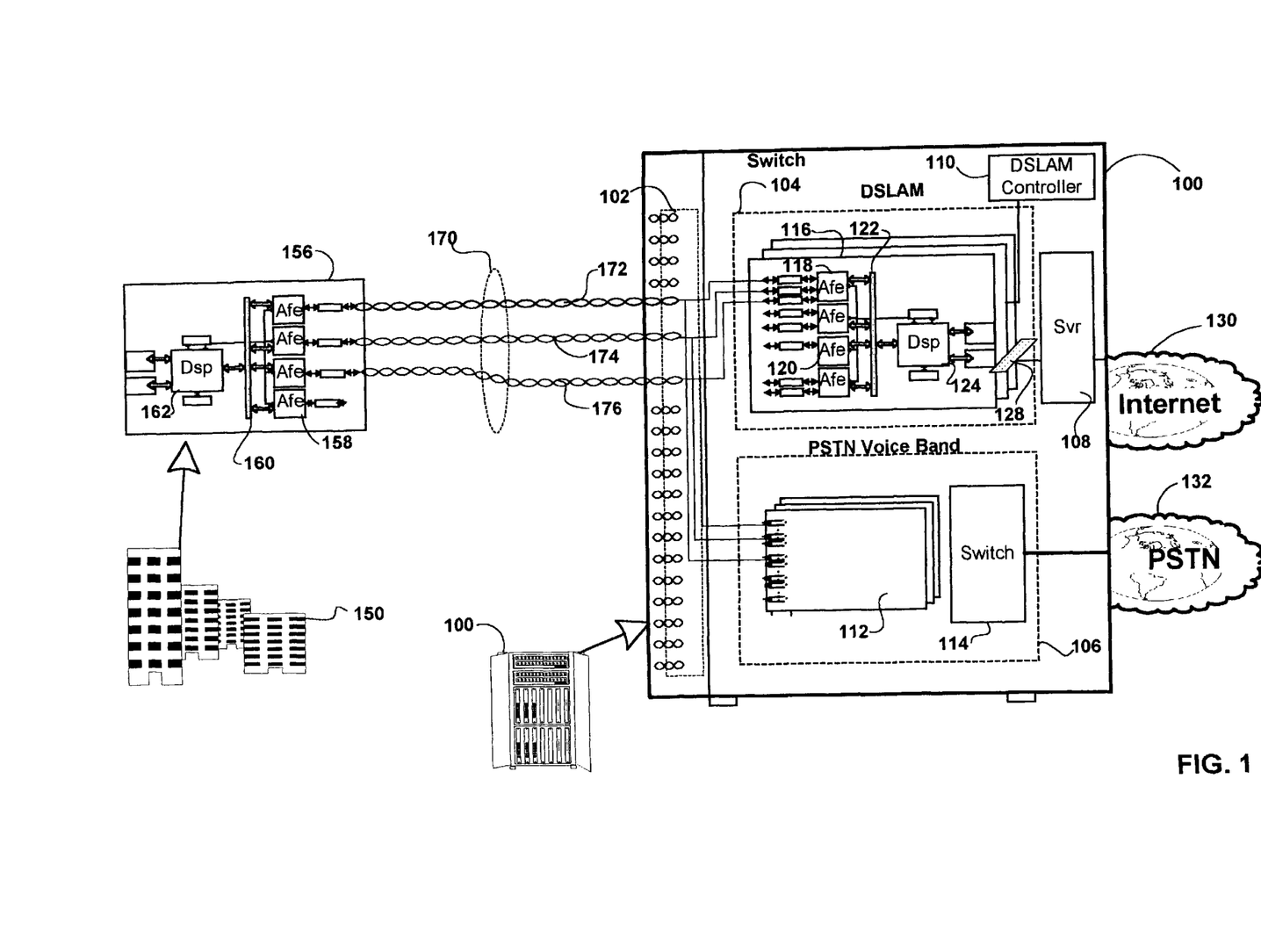
FIG. 1 shows a communication system with a pair of multi-mode multi-channel modem line cards coupled to one another by a binder of subscriber lines between a public switched telephone network (PSTN) central office (CO) and a remote site.

FIG. 1 shows a communication system with a pair of multi-mode multi-channel modem line cards coupled to one another by a binder of subscriber lines between a public switched telephone network (PSTN) central office (CO) and a remote site. The system includes a CO 100 and a remote line card 156 positioned at a remote terminal 150. The CO and remote line card are coupled to one another via a subscriber line binder 170 which includes individual subscriber lines 172, 174, 176.

Each of the subscriber line connections terminates on the CO end, in the frame room 102 of the CO. From this room connections are made for each subscriber line via splitters and hybrids to both a DSLAM 104 and to the voice band racks 106. The splitter shunts voice band communications to dedicated line cards, e.g. line card 112 or to a voice band modem pool (not shown). The splitter shunts higher frequency X-DSL communications on the subscriber line to a selected line card, e.g. line card 116, within DSLAM 104. The line cards of the current invention are universal, meaning they can handle any current or evolving standard of X-DSL and may be upgraded on the fly to handle new standards.

Voice band call set up is controlled by a Telco switch matrix 114 such as SS7. This makes point-to-point connections to other subscribers for voice band communications across the public switched telephone network 132. The X-DSL communications may be processed by a universal line card such as line card 116. That line card includes a plurality of AFE's 118–120 each capable of supporting a plurality of subscriber lines. The AFEs are coupled via a packet based bus 122 to the DSP 124. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO the AFE each received channel is converted to a digitized data sample which is sent to the DSP for demodulation. The DSP is capable of multi-protocol support for all subscriber lines to which the AFE's are coupled. Communications between AFE's and DSP(s) may be packet based, in which embodiment of the invention a distributed architecture such as will be set forth in the following FIG. 2 may be implemented. The line card 116 is coupled to a back-plane bus 128 which may be capable of off-loading and transporting low latency X-DSL traffic between other DSPs for load balancing. The back-plane bus of the DSLAM also couples each line card to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. In an alternate embodiment of the invention discrete modems would each couple to an associated one of the subscriber lines rather than the logical modem shown. When an X-DSL communication is established on a subscriber line, a specific channel identifier is allocated to that communication. That identifier is used in the above mentioned packet based embodiment to track each packet as it moves in an upstream or downstream direction between the AFE and DSP.

At the remote site a similar line card architecture is shown for line card 156 which forms a plurality of logical modems connected to corresponding ones of subscriber lines 172, 174, 176. That line card includes AFEs 158, a packet bus 160 and a DSP. In an alternate embodiment of the invention the termination at the remote site 150 would be a set of discrete modems each coupled to an associated one of the subscriber lines rather than the logical modem shown. These modules, AFE and DSP, may be found on a single universal line card, such as line card 116 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

Figure 2:
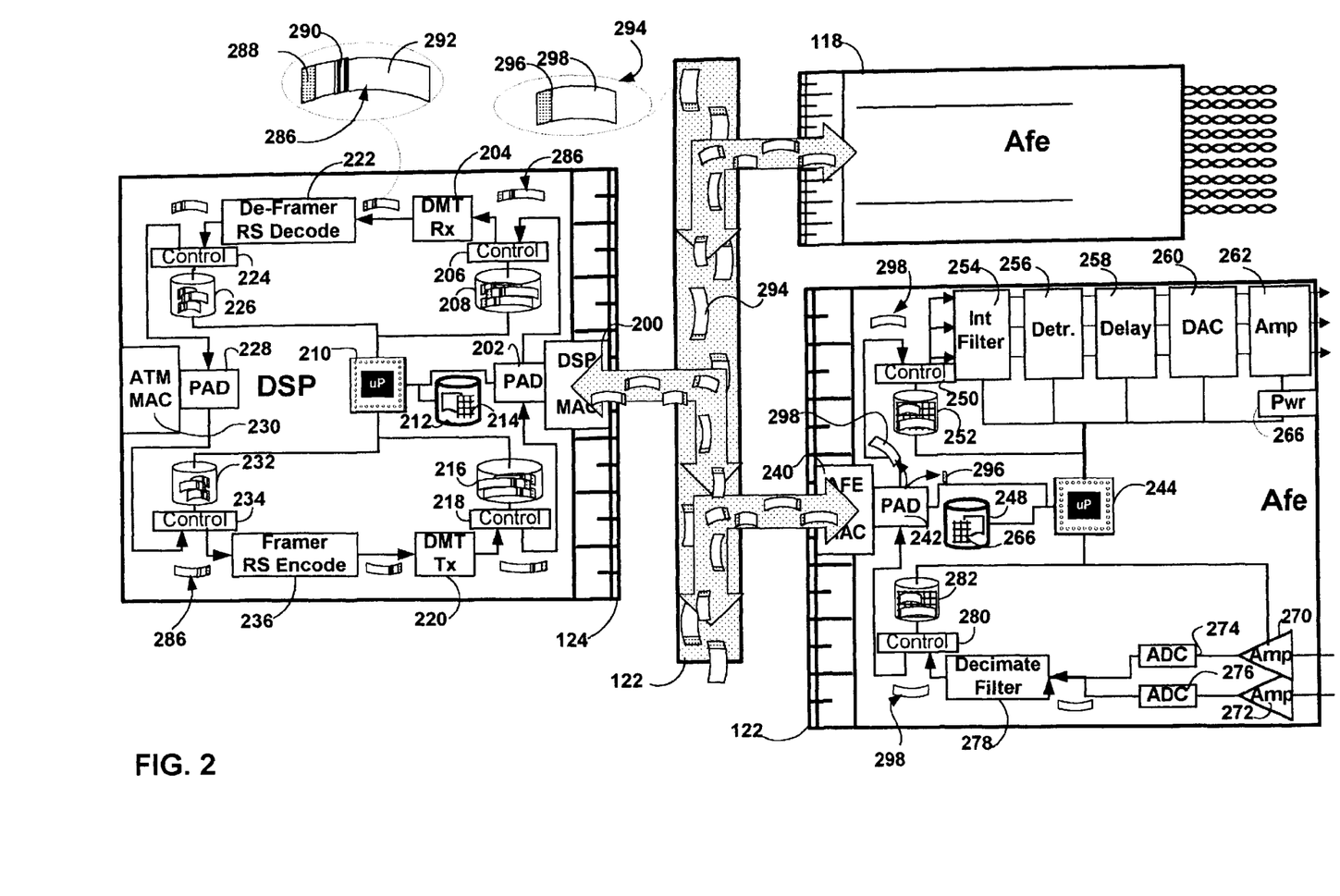
FIG. 2 is a detailed hardware block diagram of one of the modem line cards shown in FIG. 1.

FIG. 2 is a detailed hardware block are hardware block diagram of one of the modem line cards shown in FIG. 1. FIG. 2 shows a packet based multi-channel transmission architecture within which the current invention may be implenented. In this architecture a DSP 124 handles processing for a number of channels of upstream and downstream subscriber line communications via a number of AFE's. Each AFE in turn accepts packets associated with a plurality of subscriber lines to which each AFE is coupled. FIG. 2 shows a packet based raw data processing both between a DSP and AFE as well as within each DSP and AFE. Packet processing between DSP and AFE modules involves transfer of bus packets 294 each with a header portion 296 and data portion 298. The header contains information correlating the data with a specific channel and direction, e.g. upstream or downstream, of communication. The data portion contains for upstream traffic digitized samples of the received data for each channel and for downstream packets digitized symbols for the data to be transmitted on each channel. Packet processing within a DSP may involve device packets 286. The device packets may include a header 288, a control portion 290 and a data portion 292. The header serves to identify the specific channel and direction. The header may contain control information for the channel to be processed. The control portion 290 may also contain control portions for each specific component along the transmit or receive path to coordinate the processing of the packets. Within the AFE the digitized data generated for the received (upstream data) will be packetized and transmitted to the DSP. For downstream data, the AFE will receive in each packet from the DSP the digitized symbols for each channel which will be modulated in the AFE and transmitted over the corresponding subscriber line.

These modules, AFE and DSP, may be found on a single universal line card, such as line card 116 in FIG. 1. They may alternately be displaced from one another on separate line cards linked by a DSP bus. In still another embodiment they may be found displaced across an ATM network.

DSP line card 116 includes one or more DSP's. In an embodiment of the invention each may include structures set forth in the figure for handling of multiple line codes and multiple channels. The line card includes, a DSP medium access control (MAC) 200 which handles packet transfers to and from the DSP bus 122. The MAC couples with a packet assembler/disassembler (PAD) 202. For received DSP bus packets, the PAD handles removal of the DSP bus packet header 296 and insertion of the device header 288 and control header 290 which is part of the device packet 286. The content of these headers is generated by the core processor 212 using statistics gathered by the de-framer 222. These statistics may include gain tables, or embedded operations channel communications from the subscriber side. The PAD embeds the required commands generated by the core processor in the header or control portions of the device packet header. Upstream device packets (Receive packets) pass into a first-in-first-out FIFO buffer 208 which is controlled by FIFO controller 206. These packets correspond with multiple protocols and multiple channels. Each is labeled accordingly. The receive processing engine 204 in this case a DMT engine fetches packets and processes the data in them in a manner appropriate for the protocol, channel and command instructions, if any, indicated by the header. The processed data is then passed to the De-Framer and Reed Solomon Decoder 222. This module reads the next device packet and processes the data in it in accordance with the instructions or parameters in its header. The processed de-framed data is passed to the final FIFO buffer 226 which is controlled by controller 204. That data is then passed to the ATM pad 228 for wrapping with an ATM header and removal of the device header. The ATM MAC 230 then places the data with an ATM packet on the ATM network 130 (see FIG. 1).

Control of the receive modules, e.g. DMT engine 204 and de-framer decoder 222 as well as sub modules thereof is implemented as follows. The core processor 210 has DMA access to the FIFO buffer 226 from which it gathers statistical information on each channel including gain tables, or gain table change requests from the subscriber as well as instructions in the embedded operations portion of the channel. Those tables 214 are stored by the core processor in memory 212. When a change in gain table for a particular channel is called for the core processor sends instructions regarding the change in the header of the device packet for that channel via PAD 202 and writes the new gain table to a memory which can be accessed by the appropriate module, i.e. DMT module 204 or the appropriate sub module thereof as a packet corresponding to that channel is received by the module. This technique of in band signaling with packet headers allows independent scheduling of actions on a channel by channel basis in a manner which does not require the direct control of the core processor. Instead each module in the transmit path can execute independently of the other at the appropriate time whatever actions are required of it as dictated by the information in the device header which it reads and executes.

This device architecture allows the DSP transmit and receive paths to be fabricated as independent modules or sub modules which respond to packet header control information for processing of successive packets with different X-DSL protocols, e.g. a packet with ADSL sample data followed by a packet with VDSL sampled data Within the DMT Rx engine 204 for example, there may be sub modules with independent processing capability such as: a time domain equalizer, a cyclic prefix remover, a DFT, a gain scalar, a trellis decoder and a tone reorderer, as well as filters, a windowers . etc. Each of these sub modules has its counterpart on the DMT Tx engine 220 in the transmit path. Each of these may independently respond to successive device headers to change parameters between successive packets. For example as successive packets from channels implementing G.Lite, ADSL and VDSL pass through the DMT Tx engine the number of tones will vary from 128 for G.lite, to 256 for ADSL, to 2048 for VDSL. The framer and de-framer will use protocol specific information associated with each of these channels to look for different frame and super frame boundaries.

On the downstream side, i.e. Transmit, the same architecture applies. ATM data which is unwrapped by PAD 228 is re-wrapped with a device header the contents of which are again dictated by the core processor 210. That processor embeds control information related to each channel in the packets corresponding to that channel. The device packets are then passed to the FIFO buffer 232 which is controlled by controller 234. The Framer and RS encoder 236 and or sub modules thereof then processes these packets according to the information contained in their header or control portions of each device packet. The Framer then updates the device packet header and writes the resultant device packet to the DNfr transmit module 220. This module accepts the data and processes it for transmission. Transmission processing may include: tone ordering, trellis encoding, gain scaling, an IDFR, and cyclic prefix modules each with independent ability to read and respond to device headers.

From the DMT Tx engine 220 each updated device packet with a digitized symbol(s) for a corresponding channel is placed in the FIFO buffer 216 under the control of controller 218. From this buffer the device packet is sent to PAD 202 where the device header is removed. The DSP PAD places the DSP packet 294 with an appropriate header onto the DSP bus 122 for transmission to the appropriate AFE and the appropriate channel and subscriber line within the AFE.

Because the data flow in the AFE allows a more linear treatment of each channel of information an out of band control process is utilized within the AFE. In contrast to the DSP device packets which are used to coordinate various independent modules within the DSP the AFE accomplishes channel and protocol changeovers with a slightly different control method.

A packet on the bus 294 directed to AFE 122 is detected by AFE MAC 240 on the basis of information contained in the packet header. The packet is passed to PAD 242 which removes the header 296 and sends it to the core processor 244. The packet's header information including channel ID is stored in the core processor's memory 248. The information is contained in a table 266. The raw data 298 is passed to a FIFO buffer 252 under the control of controller 250. Each channel has a memory mapped location in that buffer.

On the transmit path, the interpolator 254 reads a fixed amount of data from each channel location in the FIFO buffer. The amount of data read varies for each channel depending on the bandwidth of the channel. The amount of data read during each bus interval is governed by entries in the control table for each channel which is established during channel setup and is stored in memory 248. The interpolator up samples the data and low pass filters it to reduce the noise introduced by the DSP. Implementing interpolation in the AFE as opposed to the DSP has the advantage of lowering the bandwidth requirements of the DSP bus 310 A. From the interpolator data is passed to the detector 256. The detector monitors amplitudes on each of the input lines or channels and determines which exceed a selected threshold level. Next delay buffers 258 introduce a delay in the input signals. Next digital-to-analog converter 260 converts each of the input signals on each of the input signal lines/channels to corresponding analog signals. These analog signals are introduced to the amplification stage 262, from which they are coupled to corresponding subscriber lines. The amplification stage is coupled to a power supply 266. Each of the transmit modules 254–266 is coupled to the control processor 244.

In operation the detector 256, delay 258 and logic executed by the processor 244 operate as a selector to determine which among the input lines/channels will be afforded additional degrees of amplification. This decision may include a priority table stored in memory 248. The priority table may contain information such as quality of service ("QOS") or signal-to-noise ratio ("SNR") for each signal line/channel. When the number of channels or input lines determined by the detector to have a signal levels above the threshold level exceeds available power supply, the priority table may be used to determine which of the qualifying signal lines/channels to provide additional levels of amplification for. This choice(s) are passed by the processor 244 to the associated circuitry within the amplification stage 262 and/or the power supply 266. Within the amplification stage 262 the selected input lines/channels are statistically multiplexed to either a switched power supply or switched amplifiers within that stage.

The parameters for each of the modules 254–266, i.e. filter coefficients, amplifier gain etc. are controlled by the core processor using control parameters stored during session set up. For example, where successive packets carry packets with G.Lite, ADSL, and VDSL protocols the sample rate of the filter parameters for filter 254 and the gain of the analog amplifiers within stage 262 will vary for each packet. This "on the fly" configurability allows a single transmit or receive pipeline to be used for multiple concurrent protocols.

On the upstream path, the receive path, individual subscriber lines couple to individual line amplifiers, e.g. 270–272, through splitter and hybrids (not shown). Each channel is passed to dedicated ADC modules 274–276. Next each channel may be subject to further filtering and decimation 278. As discussed above in connection with the transmit path, each of these components is configured on the fly for each new packet depending on the protocol associated with it. Each channel of data is then placed in a memory mapped location of FIFO memory 282 under the control of controller 280. Scheduled amounts of this data are moved to PAD 242 during each bus interval. The PAD wraps the raw data in a DSP header with channel ID and other information which allows the receiving DSP to properly process it.

Figure 3:
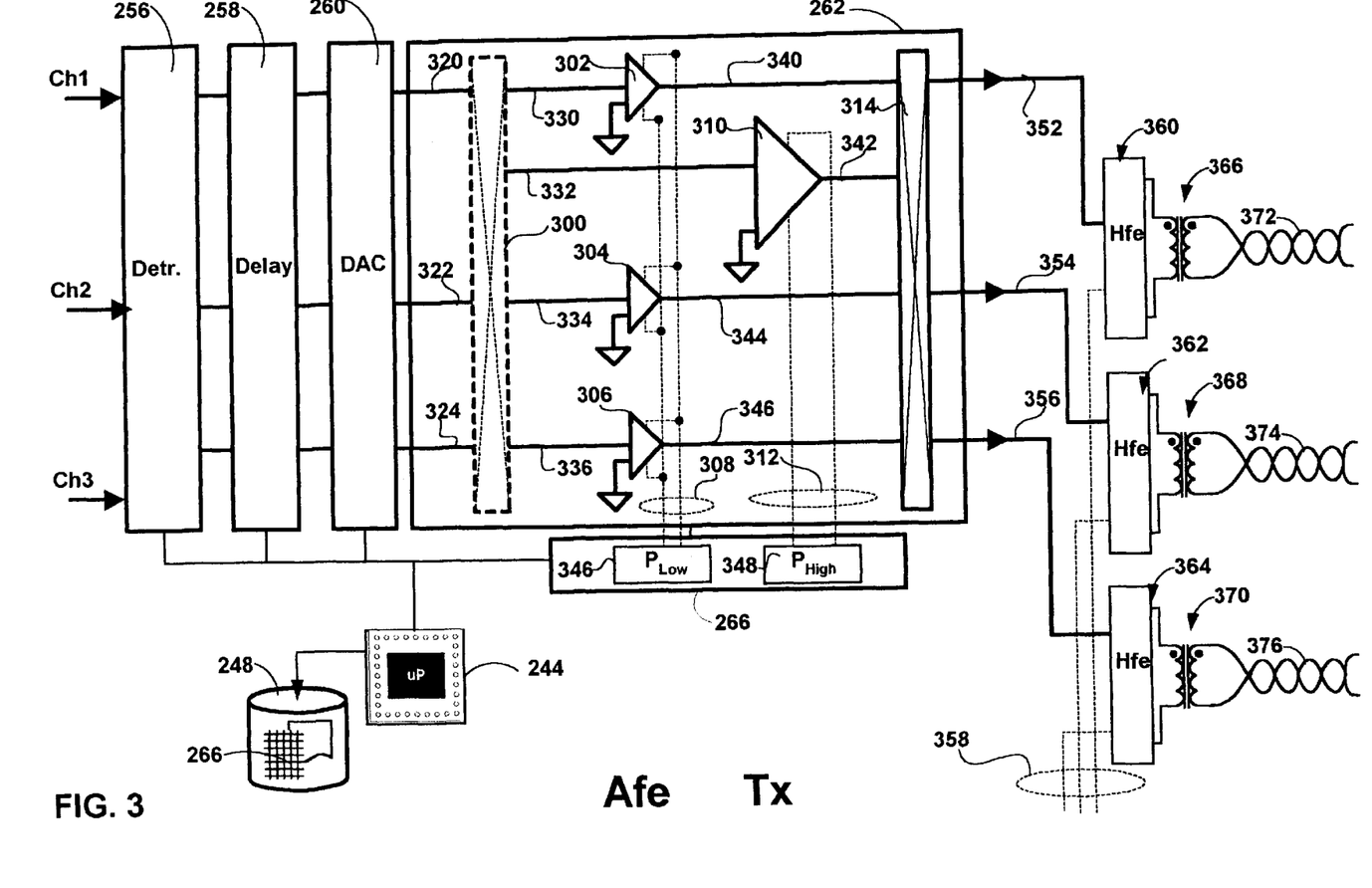
FIGS. 3–4 are detailed hardware block diagrams of alternate embodiments of the portion of the transmit path shown in the AFE of FIG. 2.
Figure 4:
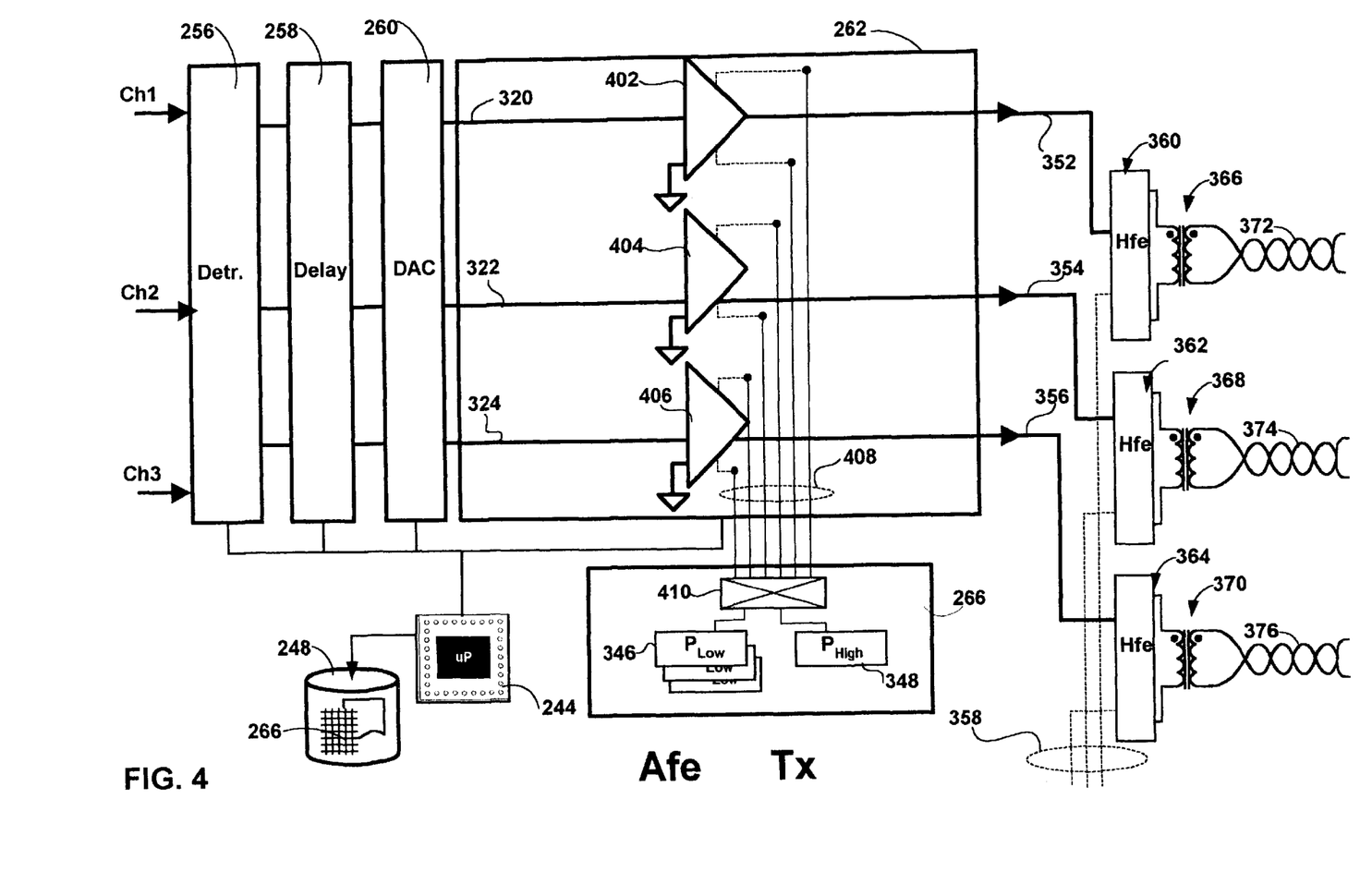

In an alternate embodiment of the invention the same packet based control principal may be used in both the transmit and receive path to implement not only multiple protocols concurrently but alternate lines codes, e.g. CAP/QAM FIGS. 34 are detailed hardware block diagrams of alternate embodiments of the portion of the transmit path shown in the AFE of FIG. 2 which supports statistical multiplexing of multiple input lines across multiple levels of amplification. In the embodiment shown in FIG. 3 each input signal line is statistically multiplexed across a plurality of amplifiers of various sizes. The detectors 256, delay buffers 258 and DAC(s) 260 are shown coupled to the signal line inputs 320–324 of the amplifier stage 262. Each of the signal line inputs 320-324 has a corresponding output signal line 352–356 respectively. These output signal lines couple via a corresponding hybrid and inductor to a corresponding subscriber line. Signal line 352 couples to subscriber line 372 via hybrid 360 and inductor 366. Signal line 354 couples to subscriber line 374 via hybrid 362 and inductor 368. Signal line 356 couples to subscriber line 376 via hybrid 364 and inductor 370. Each of the hybrids couples via a corresponding one of upstream signal lines 358 to the upstream path of the AFE.

Within the power supply 266 a first power supply 346 and a second power supply 348 are shown. The second power supply has a higher output voltage than the first power supply. Within the amplifier stage 262 an input switch 300 and an output switch 314 are shown switchably coupling various sizes and or classes of amplifiers to each of the input signal lines and their subscriber line counterparts. In the embodiment shown two levels of amplification are available for each signal line. The first level of amplification is provided by a primary amplifier which may be provided in a number sufficient to switchably couple to each subscriber line. Primary amplifiers 302,304, 306 are shown coupled to input signal lines 330, 334, and 336 respectively. The power level of the primary amplifiers is determined by the primary power supply 346 to which the power supply inputs of each of the primary amplifiers is coupled via power lines 308. Each of primary amplifiers 302, 304, 306 includes a corresponding output signal line 340, 344, 346 which couples to output switch 314. A secondary amplifier 310 is shown with an input signal line 332 coupled to the input switch 300 and an output signal line 342 coupled to the output switch. The power supply inputs of the secondary amplifier 310 are coupled via power lines 312 to the secondary power supply 348. The detector, delay, processor 244 form a selector which determines which of the input signal lines 320–324 includes input signals above a selected threshold level. Once this determination is made the processor implements logic to determine which of the selected input signals will be coupled to the secondary amplifier. Where there are more signal lines requiring additional amplification than there are secondary amplifiers the logic executed by the processor determines which among the competing signal lines will be coupled to the secondary amplifier. This determination may be based on a priority table stored in memory 248. The priority table may contain parameters such as quality of service ("QOS") or signal-to-noise ratio ("SNR") for each of the channels. A channel with a higher QOS may qualify for scarce amplifier resources to the exclusion of one with a lower QOS, for example. If for example input signal line 322 is determined by the selector to require additional amplification then switches 300 and 314 uncouple primary amplifier 304 from that input and couple signal line 322 to the input 332 of the secondary amplifier 310. The output 342 of that amplifier is coupled via switch 314 to output signal line 354. The remaining input signal lines remain coupled to the corresponding primary amplifier.

In alternate embodiments of the invention a plurality of secondary amplifiers may be provided. In another embodiment of the invention the number of primary amplifiers may be less than the number of input signal lines with secondary amplifiers making up the difference. In still another embodiment of the invention more than a primary and a secondary level of amplification may be provided.

In the embodiment shown in FIG. 4 each input signal line is statistically multiplexed across a plurality of power supply levels delivered to the individual amplifiers associated with each of the input signal lines. Each of the signal line inputs 320–324 has a corresponding output signal line 352–356 respectively. Each signal line includes an associated amplifier capable of supporting more than one output power level. Amplifier 402 accepts input from signal line 320 and provides output to signal line 352. Amplifier 404 accepts input from signal line 322 and provides output to signal line 354. Amplifier 406 accepts input from signal line 324 and provides output to signal line 356.

Within the power supply 266 a first power supply 346 and a second power supply 348 are shown coupled via a switch 410 and power supply lines 408 to the power supply inputs of amplifiers 402, 404, 406. The first power supply 346 is shown as three discrete sources each of which may be used to drive a corresponding one of the amplifiers 402–406. The second power supply 348 is shown as a single source since it is sized to supply power to a selected one of the amplifiers 402–406. Thus the second power supply is configured to be statistically shared between the amplifiers 402–406. The detector, delay, processor 244 form a selector which determines which of the input signal lines 320–324 includes input signals above a selected threshold level. Once this determination is made the processor implements logic to determine which of the selected input signals will have its associated amplifier coupled to the higher voltage power supply 348 via switch 410. Where there are more signal lines requiring additional amplification than there is capacity within the secondary power supply 348, then the logic executed by the processor determines which among the competing signal lines will be coupled to the secondary power supply. This determination may be based on a priority table stored in memory 248. The priority table may contain parameters such as quality of service ("QOS") or signal-to-noise ratio ("SNR") for each of the channels. A channel with a higher QOS may qualify for scarce amplifier resources to the exclusion of one with a lower QOS, for example. If for example input signal line 322 is determined by the selector to require additional amplification then switch 410 couples the secondary y power supply 348 to the power supply inputs of amplifier 404. The remaining amplifiers 402 and 406 couple to the primary power supply 346.

Although the above mentioned embodiments in FIGS. 3–4 both accept inputs derived from the packet based architecture provided by the logical modems formed by the DSP and AFE shown in FIGS. 1–2 such need not be the case. In an alternate embodiment of the invention the detector, delay, DAC and amplifier stages shown above may be coupled to input signal lines provided by a plurality of physical modems each with their own discrete DSP and AFE. In still other embodiments of the invention the statistical multiplexing of power may be applied with equal advantage in wireless as well as the above described wired communication mediums.

Figure 5:
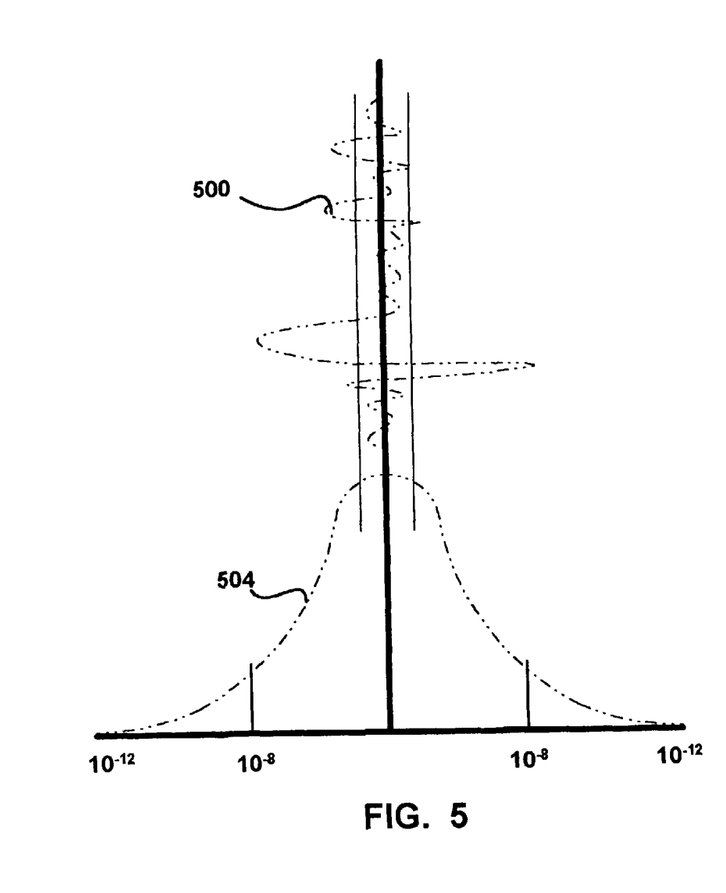
FIG. 5 is a graph showing the statistical distribution of voltages for a typical ADSL signal.
Figure 6:
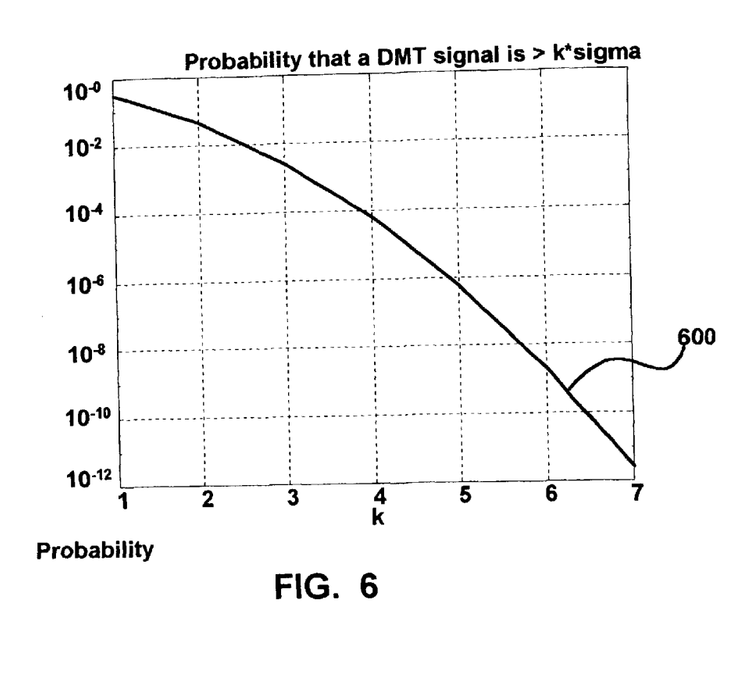
FIG. 6 is a graph which shows the statistical probability for the various voltage levels shown in FIG. 5.

FIG. 5 is a graph showing the statistical distribution 504 of voltages for a typical ADSL signal 500 with a peak to average voltage ratio ("AR") of 5.58. FIG. 6 is a graph which shows the statistical probability for the various voltage levels shown in FIG. 5. In Digital Subscriber Line (DSL) systems, one of the critical design issues is the power dissipated by the line-driver amplifiers. The large peak-to-average ratio of a typical Discrete Multitone (DMT) waveform and the strict requirements on probability of clipping lead to amplifier designs that must handle large voltage swings. However, a typical DMF signal is relatively small for a large percentage of time and only occasionally strays into the higher voltages. This means that amplifiers are somewhat over designed so that they can handle statistically infrequent "high-voltage" events.

A typical DMT signal can be modeled as a zero-mean, uncorrelated white Gaussian process. Assume that a DMT signal has a root-mean-square (RMS) voltage $\sigma$. The probability that the absolute value of the voltage is greater than a threshold T (in other words, the probability of clipping) is given by:

Assuming without loss of generality that $T=k*\sigma$, the probability can be rewritten as:

where erfc(x) is the complementary error function. FIG. 6 shows a plot 600 of the probability of a DMT signal exceeding a threshold. In DMT systems, the amplifier is typically designed to handle all events of probability<$10^{-7}$ which corresponds to k=5.33. However, it is clear from FIG. 6 that 99% of the time the signal stays below k=2.5. This shows the inherent inefficiency that is tolerated in standard designs. The embodiments of the invention shown in FIGS. 3–4 can be used in multi-channel communication systems to take advantage of the statistical nature of the random signal to reduce the average power required. The current invention takes advantage of the statistical nature of the individual signals to use a mixture of "full-sized" and smaller amplifiers. By monitoring the input signals to the amplifiers, a smaller amplifier can be switched in and used when the input signal is small. The larger amplifiers would only be used if the signal were to reach the statistically rare peaks. The number of large or small amplifiers does not have to be the same and there can be more than 2 types of amplifiers.

EXAMPLE:

Assume that there is a two-port system that contains one "large" amplifier (capable of handling voltage swings with a probability of clipping equal to $10^{-7}$) and two smaller amplifiers (of to be decided size). Normally, the ports use the smaller amplifiers. When the control logic detects a large sample on one of the ports, it switches in the large amplifier. Obviously, if both ports have a "large" output simultaneously, there will be a conflict and one of the ports will be forced to use the small amplifier (and thus clip). Therefore, the problem is to determine the size of the smaller amplifiers (i.e. what voltage swings they can handle), to keep the probability of this collision smaller than the original probability of clipping.

Define the probability that one of the channels will need to use the large amplifier as $P_L$. Assuming the two data sequences are uncorrelated, the probability that both channels will need the large amplifier is $P_L^2$. Using the requirement from above that $P_L^2 \leq 10^{-7}$ results in $P_L \leq 10^{-3.5}$. Referring to FIG. 6 (and assuming Gaussian signals), this corresponds to the smaller amplifier being able to handle k=3.6 as opposed to k=5.33 for the large amplifier (a reduction of approximately 3 dB).

Generalization to N Ports Using N Small Amplifiers and 1 Large Amplifier:
Assumptions:
1. Define the desired probability of clipping as $P_c$ (known)
2. Define the probability of a single channel needing the large amplifier as $P_L$ (to be solved for)
3. Assume that all N channels are independent. (not necessarily Gaussian)

The probability that two or more channels need to use the large amplifier is given by:

P($\geq$two channels of N)=1−P(one channel of N)−P(zero channels of N).

Using combinatorial analysis, it can be shown that
Substituting results in
Setting the above expression equal to $P_c$ and then solving for $P_L$ determines the size of the "small" amplifier required. The following table shows the values of k that need of N. (note that the large amplifier needs to support to be supported for a given value of N. (note that the large amplifier needs to support k=5.33)

Figure 7:
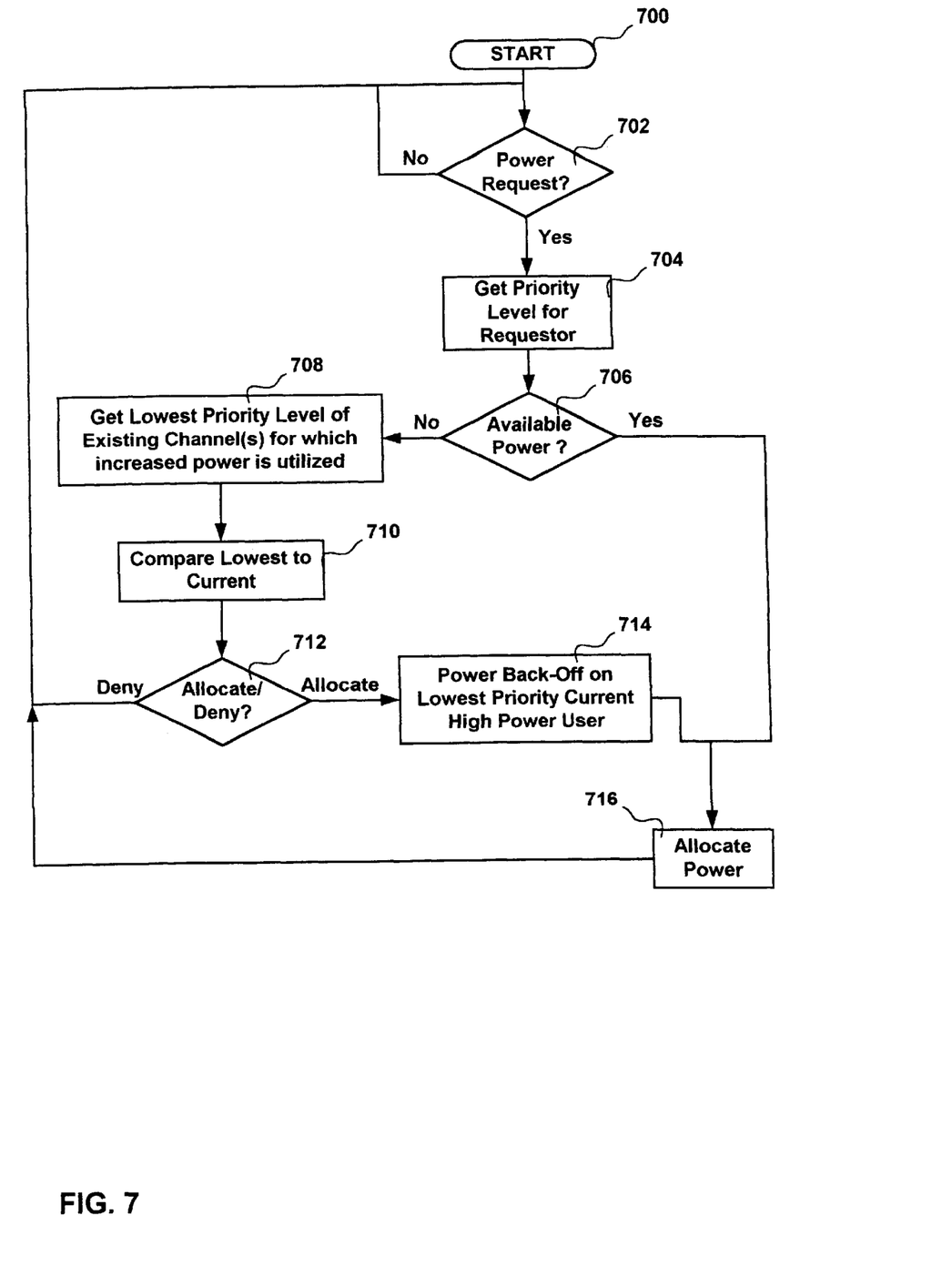
FIG. 7 is a process flow diagram of the processes associated with statistical multiplexing of line driver power in a multi-channel environment in accordance with an embodiment of the invention.

FIG. 7 is a process flow diagram of the processes associated with statistical multiplexing of line driver power in a multi-channel environment in accordance with an embodiment of the invention.

Processing begins at start block 700 from which control is passed to decision process 702. In decision process 702 a determination is made by the selector as to whether a request for power is warranted. This request as discussed above may be based on a determination by detector 256 (See FIGS. 2–4) that the input signal level on one or more of the input signal lines exceeds a threshold level. If such a request is made control passes to process 704. In process 704 the priority level of the requester is determined. This determination may be based on the time of the request, the QOS for the associated signal line, or the SNR for that line, for example. Control then passes to decision process 706 for a determination as to the availability of additional amplification power. That power may be provided by multiplexing of amplifiers across signal lines (See FIG. 3) or by multiplexing of supply power levels to dedicated amplifiers associated with each input line (See FIG. 4). If power is available then control passes to process 716 for the allocation of power to the selected input line/channel as shown in FIGS. 3–4. Alternately, if no power is available, control passes to process 708. In process 708 the lowest priority level of those input signal lines/channels currently receiving enhanced power levels is determined. Control is then passed to process 710. In process 710 the priority level of the current requester of high power is compared with the lowest priority among the existing users of the high power. Then in decision process 712 the requester is either given a higher power level or denied that level depending on the priority determined in process 708. If power is not allocated to the requester then control returns to decision process 702. If power is allocated to the requestor then the lowest priority of the existing users is removed from the higher power level in process 714. Control then passes to process 716 in which the power is allocated to the requestor.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for providing amplification of input signals on corresponding ones of a plurality of input signal lines, and the apparatus comprising:
  a plurality of primary amplifiers each with an input and an output, with each input coupled to a corresponding one of the plurality of input signal lines, and each of the plurality of primary amplifiers capable of receiving a corresponding input signal and generating an output signal at up to a first power level;
  at least one secondary amplifier with an input and an output, and the at least one secondary amplifier responsive to a selected input signal at the input to generate at the output an output signal at up to a second power level greater than the first power level;
  a selector with inputs coupled to each of the input signal lines to select at least one input signal line with an input signal amplitude above a selected threshold for amplification by said at least one secondary amplifier; and
  switches responsive to said selector for switchably coupling the at least one secondary amplifier to the at least one selected input signal line.

2. The apparatus for providing amplification of claim 1, wherein said selector further comprises:
  a detector with inputs coupled to each of the input signal lines for detecting which among the input signal lines includes input signal amplitudes above the selected threshold; and
  logic for choosing among the input signal lines with input signal amplitudes above the selected threshold, at least a selected one of the input signal lines for coupling to said at least one secondary amplifier.

3. The apparatus for providing amplification of claim 1, wherein said selector further comprises:
  a priority table listing relative priority parameters for each of the input signal lines to determine which among several input signal lines with input signal amplitudes above the selected threshold to couple to the at least one secondary amplifier.

4. The apparatus of claim 3, wherein said priority table parameters for each of the input signal lines include at least one of quality of service and signal-to-noise ratio.

5. The apparatus for providing amplification of claim 1, wherein said selector further comprises:

a plurality of delay buffers each associated with a corresponding one of the input signal lines for delaying a presentment of the input signals to said switches.

6. The apparatus for providing amplification of claim 1, further comprising:

at least one digital-to-analog converter with inputs coupled to each of the plurality of input signal lines and outputs coupled to the inputs of each of said plurality of primary amplifiers for converting each of the input signals from a digital to an analog form.

7. The apparatus of claim 1, wherein said switches further comprise:

an input set of switches for switchably coupling each of said plurality of input signal lines to a selected one of the corresponding one of said plurality of primary amplifiers and the input of said at least one secondary amplifier.

8. The apparatus of claim 1, further comprising:

a plurality of subscriber lines each associated with a corresponding one of the plurality of input signal lines; and an output set of switches for switchably coupling the output of the at least one secondary amplifier to the corresponding at least one of the plurality of subscriber lines and for switchably coupling remaining ones of the plurality of subscriber lines to the outputs of corresponding ones of said plurality of primary amplifiers.

9. An apparatus for providing amplification of input signals on corresponding ones of a plurality of input signal lines, and the apparatus comprising:

a plurality of amplifiers each with a signal input, a signal output, and a power supply input and with each signal input coupled to a corresponding one of the plurality of input signal lines, and each of the plurality of amplifiers capable of receiving a corresponding input signal and generating an output signal;

a first power supply generating a corresponding first power level;

at least a second power supply generating at least a corresponding second power level greater than the first power level;

a selector with inputs coupled to each of the input signal lines to select at least one input signal line with an input signal amplitude above a selected threshold; for amplification at up to the second power level; and switches responsive to said selector for switchably coupling said at least a second power supply to the power supply input of the corresponding at least one of the plurality of amplifiers coupled to the at least one selected input signal line and further switchably coupling power supply inputs of remaining unselected ones of the plurality of amplifiers to said first power supply.

10. The apparatus for providing amplification of claim 9, wherein said selector further comprises:

a detector with inputs coupled to each of the input signal lines for detecting which among the input signal lines includes input signal amplitudes above the selected threshold; and logic for choosing among the input signal lines with input signal amplitudes above the selected threshold, at least a selected one of the input signal lines for coupling to said at least second power supply.

11. The apparatus for providing amplification of claim 9, wherein said selector further comprises:

a priority table listing relative priority parameters for each of the input signal lines to determine which among several input signal lines with input signal amplitudes above the selected threshold to couple to the at least second power supply.

12. The apparatus of claim 11, wherein said priority table parameters for each of the input signal lines include at least one of quality of service and signal-to-noise ratio.

13. The apparatus for providing amplification of claim 9, wherein said selector further comprises:

a plurality of delay buffers each associated with a corresponding one of the input signal lines for delaying a presentment of the input signals to said switches.

14. The apparatus for providing amplification of claim 9, further comprising:

at least one digital-to-analog converter with inputs coupled to each of the plurality of input signal lines and outputs coupled to the inputs of each of said plurality of amplifiers for converting each of the input signals from a digital to an analog form.

15. A method for amplifying of input signals on corresponding ones of a plurality of input signal lines, and the method comprising the acts of:

detecting which among the input signal lines includes input signal amplitudes above a selected threshold;

choosing among the input signal lines with input signal amplitudes above the selected threshold, at least a selected one of the input signal lines for further amplification;

amplifying the at least a selected one of the input signal lines at up to at least a second power level greater than a first power level, and amplifying remaining unselected ones of the input signal lines at up to the first power level.

* * * * *